Feb. 5, 1963 P. H. WILLIAMS ET AL 3,076,349
SHIFT MECHANISM
Filed Sept. 11, 1961 4 Sheets-Sheet 1

INVENTORS
PAUL H. WILLIAMS
WILBERT E. BELLER
BY
Bayard H. Michael
ATTORNEY

FIG. 2

INVENTORS
PAUL H. WILLIAMS
WILBERT E. BELLER
ATTORNEY

Feb. 5, 1963 — P. H. WILLIAMS ET AL — 3,076,349
SHIFT MECHANISM
Filed Sept. 11, 1961 — 4 Sheets-Sheet 4

INVENTORS
PAUL H. WILLIAMS
WILBERT E. BELLER
BY
ATTORNEY

United States Patent Office 3,076,349
Patented Feb. 5, 1963

3,076,349
SHIFT MECHANISM
Paul H. Williams, Elmhurst, and Wilbert E. Beller, Park Ridge, Ill., assignors to Controls Company of America, Schiller Park, Ill., a corporation of Delaware
Filed Sept. 11, 1961, Ser. No. 137,254
23 Claims. (Cl. 74—335)

This invention relates to a transmission shifting mechanism and, more particularly, to an improved solenoid operated transmission shifting mechanism particularly suited for washing machines.

Solenoid operated mechanisms of the prior art use two solenoids, each in constant motion astraddle individual shift bars which are connected to a washing machine transmission. With the prior art arrangement there exists the possibility of faulty actuation of the shifting mechanism at the completion of a spin cycle when the washing machine is set for a rinse cycle, the spin solenoid being de-energized and the agitate solenoid being energized. At this time the machine motor is de-energized so that the machine cannot agitate while the basket is spinning. However, the machine motor has residual power (back E.M.F. due to the spin action feed back to the motor) that will energize the agitate solenoid and shift the transmission to agitate. This causes a highly detrimental clashing of the transmission gears. To prevent the occurrence of this faulty operation, elaborate sequencing of timer cams is necessary at this washer cycle interval, which adds to the complexity and cost of the timer, thus, in effect, increasing the cost of the shift mechanism.

It is an object of this invention to provide a reliable and effective shifting mechanism which represents a reduction in cost.

Another object of this invention is to provide a transmission shifting mechanism which will provide improved operation.

A still further object of this invention is to provide a transmission shifting mechanism incorporating a minimum number of parts which are compactly arranged to occupy a minimum of space and result in a further savings in cost.

For the accomplishment of these objects this invention contemplates the provision of a transmission shifting mechanism which utilizes only a single solenoid to produce the shifting between transmission operations; and, further, a shifting mechanism which includes a sensing mechanism for controlling the energization and de-energization of the solenoid to prevent faulty operation.

The novel features of this invention are set forth in the appended claims. The invention itself, together with additional objects and advantages thereof, will be more clearly understood from a reading of the following description in connection with the accompanying drawings wherein:

The shifting mechanism 2 of this invention can be used to selectively shift any transmission through a plurality of operative positions; however, the mechanism is particularly well suited to use in a washing machine and hence will be described with reference to a washing machine and as shifting from neutral to spin or agitate cycles. A mechanism constructed in accordance with the teachings of this invention is to be incorporated in a washing machine of a leading manufacturer to control and selectively shift the washer drive mechanism.

A shifting mechanism 2 includes a U-shaped frame 4 comprising a web 6 and an upper leg 8 and a lower leg 10. A shaft 12 extends through the washing machine transmission housing 13 and is rigidly attached to the lower leg 10 by a combination collar 14 and set screw 16. A suitable drive (not shown) is provided for imparting oscillatory motion to the U-shaped frame 4 through the shaft 12 so that the frame oscillates relative to the housing 13.

A solenoid 18 is suitably mounted on the frame 4 and includes a solenoid coil assembly 20 and a solenoid plunger 22. The solenoid coil assembly rests in a shouldered aperture 21 in the lower leg 10 and a tab 23 is formed in the upper leg 8 and engages the upper surface of the solenoid 18 so that the solenoid 18 is rigid with and oscillates with the frame 4. The plunger 22 is movable in the aperture 21 relative to the frame 4 upon energization and de-energization of the coil 20. A stop 24 fixedly connected in an aperture 26 in the upper leg 8 limits the upward travel of the plunger 22 upon energization of the coil. The stop 24 also acts in the nature of a bushing, in that the plunger 22 is provided with a portion 28 of reduced cross section which extends through an aperture 30 in the stop 24 and, as will be more fully described hereinafter, is rotatable in the stop 24 and relative to the frame 4.

The lower end of the solenoid plunger 22 is bifurcated so as to include a pair of relatively spaced apart arms 32 disposed on opposite sides of an elongated shift bar 34. The shift bar 34 is supported by guide members 36 which are rigid with the housing 13. The shift bar 34 is loosely disposed in apertures 38 in the guides and is slideable relative to the housing 13 and in the direction of the longitudinal axis of the shift bar. A spring 40 is connected to the housing 13 and is engaged in an elongated aperture 42 provided in the shift bar 34 to maintain engagement of the shift bar 34 in the guide members 36. The shift bar includes an arm 39 which extends from the shift bar in the direction of its movement and is suitably connected to a transmission (not shown). The shift bar, as will be more completely described hereinafter, can assume either a neutral, a spin or an agitate position, in which positions the extension arm 39 has been moved to shift the transmission to a neutral, spin or agitator setting respectively.

The elongated shift bar 34 includes a longitudinally extending slot 44. As viewed in the drawings, the slot 44 comprises a lower slot 46 corresponding to the neutral setting of the transmission, an upper left slot 48 corresponding to the spin setting and an upper right slot 50 corresponding to the agitate setting. The neutral slot 46, spin slot 48 and agitate slot 50 are relatively spaced in a direction extending transversely of the longitudinal axis of the shift bar 34; slots 48 and 50 are preferably disposed on the same side of the slot 46. The spin and agitate slots are connected to the neutral portion by vertical slots 52 and 54 extending transversely of the longitudinal axis of the shift bar 34. Preferably the slots 52 and 54 extend between the ends of the neutral portion 46 and the ends of the spin and agitate portions 48 and 50 which are adjacent the ends of the neutral portion. The slots 52 and 54 provide access between the neutral, spin and agitator portions to provide a continuous elongated slot in the shift bar 34.

Figures 3, 4:
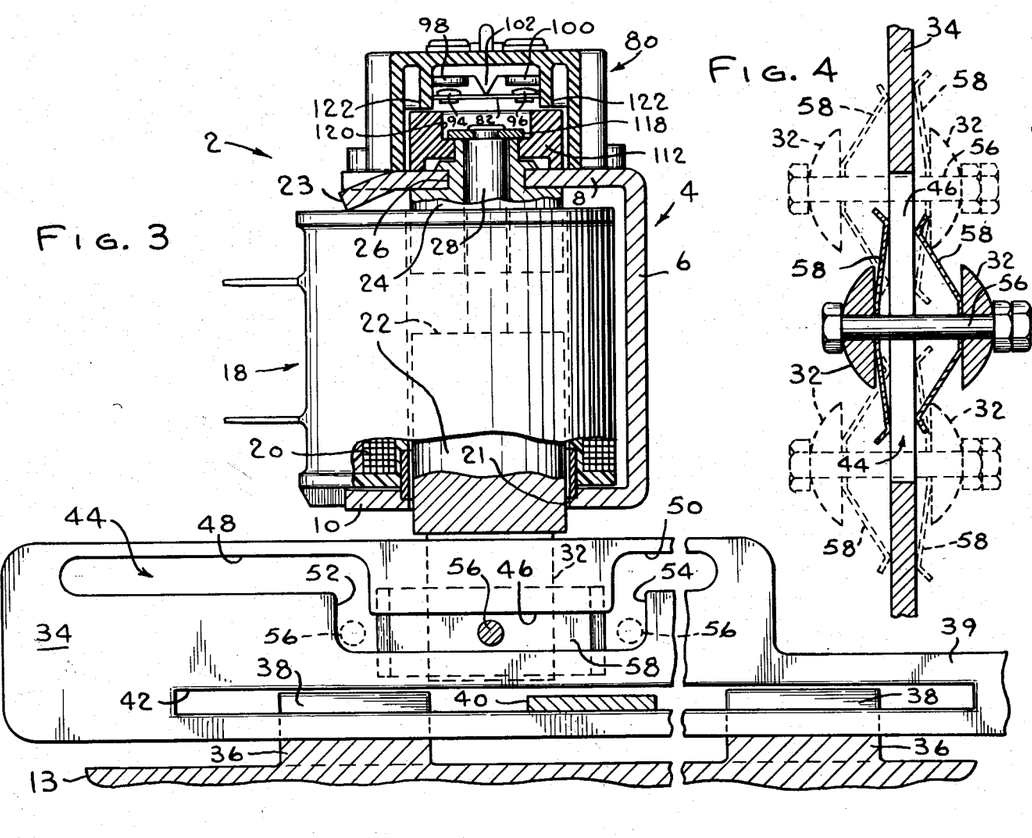
FIG. 3 is a cross sectional view taken along lines 3—3 of FIG. 2.
FIG. 4 is a cross sectional view taken along lines 4—4 of FIG. 2.

A shift pin 56 extends between the arms 32 in the bifurcated end of the plunger 22 and is disposed in the elongated slot 44. As oscillatory motion is transmitted to the solenoid 18, the shift pin 56 moves longitudinally of the shift bar 34 in the slot 44. Further, the shift pin 56, being rigidly connected to the plunger 22, is movable transversely of the longitudinal axis of the shift bar 34 upon energization and de-energization of the solenoid 18. Referring to FIG. 3, the pin is illustrated in dotted at the extreme ends of its travel. When the solenoid is energized and moves the pin into the spin slot 48, the pin is at the extreme left end of its travel and on its return travel engages and displaces the shift bar to the right. Similarly, when the pin is moved to the slot 50 it is at the extreme right end of its travel and on return engages and displaces the shift bar to the left. Therefore, it is the shift pin which engages and displaces the shift bar to its operative positions.

Figure 1:
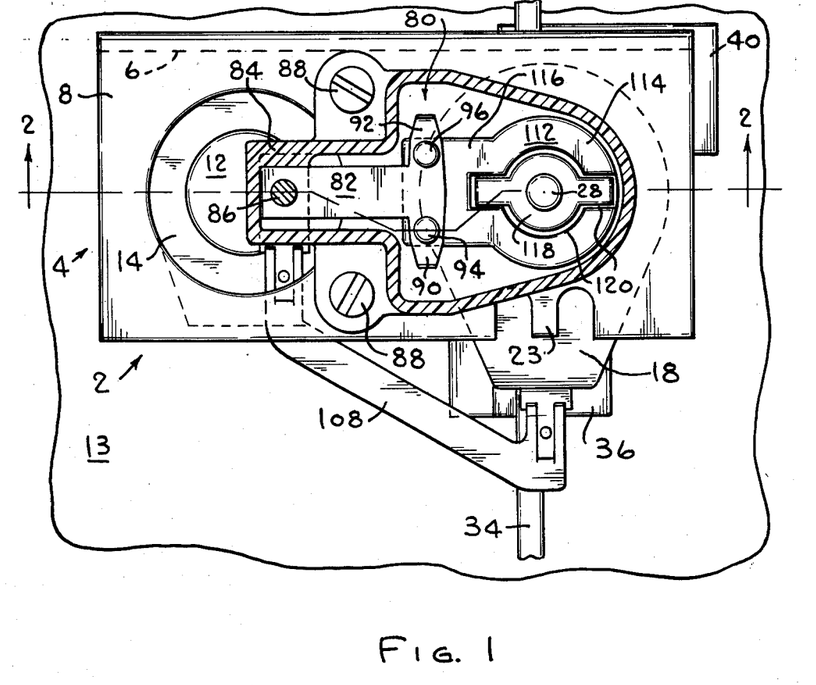
FIG. 1 is a top plan view of this invention.
Figure 2:
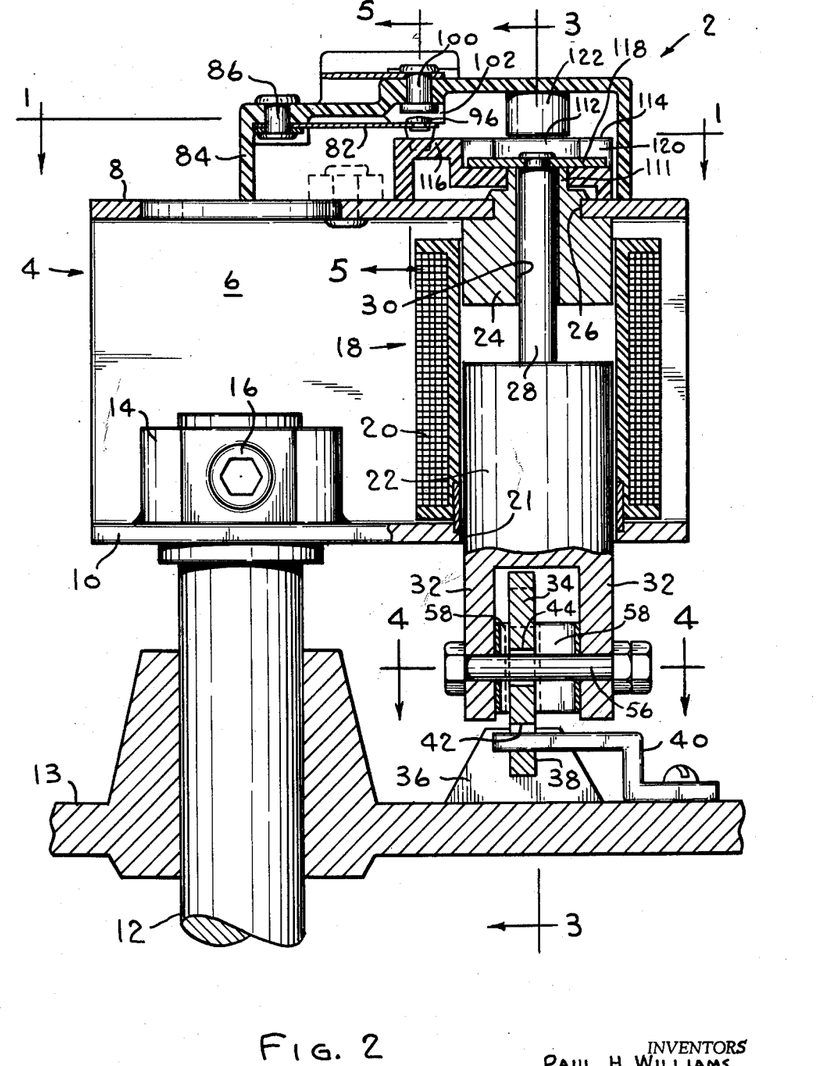
FIG. 2 is a cross sectional view taken along lines 2—2 of FIG. 1.

Referring to FIGS. 2 and 4, a spring member 58 is positioned on pin 56 on both sides of the shift bar 34 so that the springs are seated between the shift bar and each of the legs 32. The oscillatory motion of the frame 4, and correspondingly solenoid 18, generally follows an arcuate path. As the pin 56 oscillates within the slot 44 the springs 58 move along the shift bar and alternately compress and expand, as illustrated in FIG. 4 wherein the pin and springs are shown at the extreme ends of the oscillatory travel of the pin. As was discussed above, the plunger 22 is mounted for rotation relative to the frame. The spring 58 maintains a fixed relationship between the axis of the pin 56 and the longitudinal axis of the shift bar, i.e. substantially perpendicular, which results in relative rotational movement between the frame 4 and the plunger 22. Therefore, the solenoid plunger 22 is mounted for oscillation with and with respect to the frame 4.

Figures 6, 7, 8, 9:
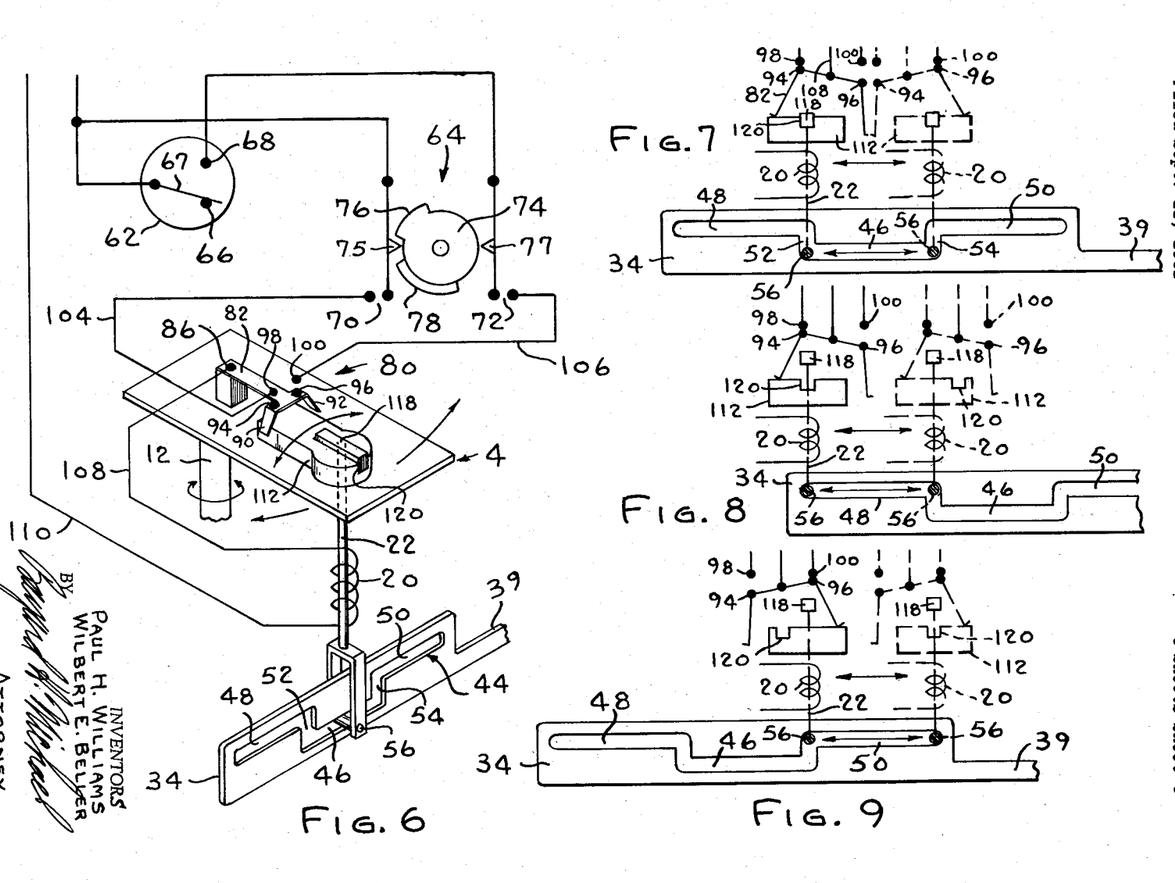
FIG. 6 is a semi-diagrammatical perspective view of the switching mechanism of this invention and its electrical control circuit.
FIG. 7 is a semi-diagrammatical illustration of the shifting mechanism in a neutral position.
FIG. 8 is a semi-diagrammatical illustration of the shifting mechanism in one of its operative positions.
FIG. 9 is a semi-diagrammatical illustration of the shifting mechanism in another one of its operative positions.

Referring to FIG. 6, a washing machine is generally provided with a control system for selecting a particular operation. This control includes a pressure switch 62 and a timer 64. The pressure switch 62 is controlled by the water in the washing machine and includes fixed contacts 66 and 68 and a movable contact arm 67. The pressure switch is operative to control the drive mechanism of the washing machine by permitting a wash cycle only when the water in the machine is at a predetermined level and by permitting a spin cycle only when the machine is in an empty condition. Hence, the contacts 66 and 68 correspond to empty and full conditions of the machine respectively and will be engaged by the movable contact arm 67 only when the proper condition exists in the machine. For convenience the contacts 66 and 68 will be referred to as spin and agitate contacts, respectively, in the remainder of this description. The timer 64 includes normally open switches 70 and 72, which in this instance correspond to spin and agitate cycles respectively, and timing bank 74 having cam discs 76 and 78. For convenience the timing bank has been illustrated as including only two discs 76 and 78 which are relatively spaced along the axis of the cam 74 for sequentially engaging cam followers 75 and 77 to close the switches 70 and 72.

This control system provides for pre-selection of a desired operation of the shifting mechanism; however, the circuit to the solenoid coil which controls the position of the shift pin 56, and correspondingly the movement of the shift bar, is completed through a sensing switch mechanism 80. The sensing switch mechanism insures positive sequential operation of the switching mechanism and prevents faulty actuation of the shifting mechanism, i.e. with the control system set for a spin cycle it prevents premature energization of the solenoid and movement of the shift pin to displace the shift bar to an agitate cycle.

Figure 5:
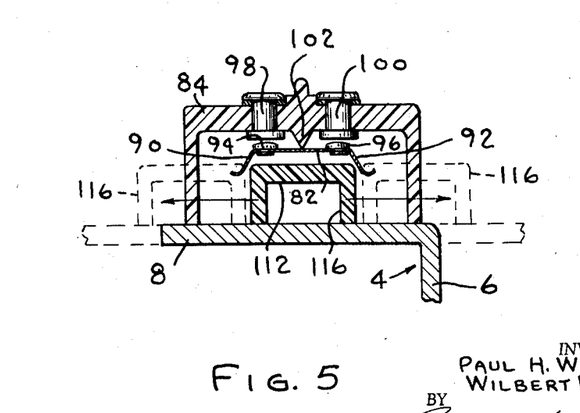
FIG. 5 is a cross sectional view taken along lines 5—5 of FIG. 2.

The sensing mechanism 80 includes a T-shaped switch blade 82 rigidly connected in a switch case 84 by a rivet 86. The case 84 is rigidly attached to the upper leg 8 of the frame 4 by rivets 88 so that the case 84 and the switch blade 82 oscillates with the frame 4. The switch blade 82 is provided with laterally extending arms 90 and 92 carrying electrical contacts 94 and 96 respectively. The electrical contacts 94 and 96 are disposed adjacent fixed electrical contacts 98 and 100 supported from the switch case 84. A pivot 102, see FIG. 5, is disposed intermediate the fixed contacts 98 and 100 and normally holds the contacts 94 and 96 in spaced relation from the fixed contacts. Contacts 98 and 100 are respectively electrically connected to the switches 70 and 72 of the timer 64 by electrical leads 104 and 106, with the rivet 86 providing a common terminal for both of the contacts 94 and 96 and being electrically connected to one side of the solenoid coil 20 by a bus bar 108. The other side of the solenoid coil 20 is connected to a suitable electrical source through a line lead 110. It can thus be seen that the energization of the solenoid coil 20 is initially selected by the pressure switch 62 and the timer 64, but completion of the circuit through the solenoid coil is made by the sensing switch mechanism 80.

Also provided within the switch case 84 is a switch actuating cam 112, having a generally circular body 114 and a radially extending finger 116. A pawl 118 is mounted on plunger extension 30 and adapted to be positioned within a cooperating aperture 120 in the cam 112. When the solenoid 18 is de-energized the pawl 118 is disposed within the aperture 120 so that a driving connection is made between the cam 112 and the plunger 22 and they are movable together. As was discussed above, the plunger 22, in addition to oscillating with the frame 4, is also rotatable or oscillatable relative thereto. When the cam 112 is connected to the plunger 22, the cam oscillates with the frame and also oscillates with respect to the frame and, correspondingly, with respect to the switch blade 82. As can be seen in FIG. 5, the ends 90 and 92 of the switch blade 82 are bent downwardly and are disposed to be engaged by the finger 116 as the frame oscillates and the finger rotates relative thereto, so that the camming portion 112 alternately closes contacts 94—98 and 96—100.

The camming portion 112 merely rests on the leg 8 of the frame and is rotatably mounted on the end 111 of stop 24. Stops 122, integral with the case 84, prevent upward movement of the cam 112.

The driving connection between the camming portion 112 and the plunger 22 exists only when the solenoid 18 is de-energized, for upon energization of the solenoid the plunger 22 is moved toward the stop 24 which removes the pawl 118 from the aperture 120. This releases the camming portion from rotatable movement with the plunger so that with the solenoid energized the camming portion merely oscillates with the frame 4. It should be noted that energization of the solenoid can only occur when the camming portion has contacted one of the ends 90 or 92 of the switch blade 82 to close the sensing switch contacts. With the camming portion in contact with the switch blade the pawl 118 is freed, leaving the camming portion in contact with the blade which in turn holds the camming portion in that switch actuating position.

The operation of the shifting mechanism will now be described with particular reference being made to FIGS. 6–9. In FIGS. 7–9 it should be noted that the solenoid coil and plunger and the entire sensing switch have been illustrated at the ends of the oscillatory travel of the shift pin. In this preferred embodiment, electrical contacts 66, 70 and 94—98 correspond to the spin cycle and contacts 68, 72 and 96—100 correspond to the agitate cycle. The shift bar 34 normally assumes a neutral position with the shift pin 56 disposed in the neutral portion 46 of the slot 44. In this position the transmission is in neutral and the solenoid is de-energized. It should be noted that the oscillatory travel of the plunger 22 is equal to the length of the neutral, spin and agitate portions of the slot 44, so that when the shift bar 34 is in either of these positions the shift pin 56 oscillates freely with respect to the shift bar. Also it should be noted that cam 112 will oscillate between contacts 94—98 and 96—100 without energizing the coil 20 until the pressure switch 62 and the timer 64 set up the requisite circuit.

When the timer 64 has rotated to close contact 70 and the pressure switch closes the empty or spin contact 66 the circuit to the coil is set up and is dependent upon closure of contacts 94—98 in the sensing switch. The shift pin 56 is oscillating within the neutral slot 46 and as the shift pin 56 approaches vertical slot 52 the cam 112, due to its relative rotational movement with respect to the switch 80, is approaching the switch contacts 94—98. As the shift pin 56 reaches the slot 52 the cam 112 closes the contacts 94—98 and completes the circuit through the solenoid coil 20. The solenoid coil is energized and lifts the shift pin in slot 52, which in addition to providing access between the portions 46, 48 and 50 of the elongated slot 44, also provides means for establishing engagement between the shift pin 56 and the shift bar 34. When the shift pin 56 is raised by the plunger 22 it is at the left end of its travel, the pin then engages the shift bar 34 and displaces the shift bar to the right, thereby actuating the transmission and shifting it to spin. With the shifting operation completed, the mechanism assumes the position illustrated in FIG. 8 with the shift pin oscillating freely within the spin slot 46 of the elongated slot 44, and with the cam 112 holding contacts 94—98 closed to maintain the energization of the solenoid 18. When the solenoid 18 was energized and the plunger 22 moved into the spin slot 48, the pawl 118 was removed from the slot 120 thereby freeing the cam 112 for pure oscillatory motion with the frame 4. As the pin 56 oscillates within the spin slot 48, relative rotational movement between cam 112 and the pawl 118 will now occur so that the pawl 118 and the opening 120 will alternately be moved into and out of registry, see FIG. 8.

At the completion of the spin cycle timing cam 64 has rotated sufficiently to free disc 76 from cam follower 75 and open switch 70 and de-energize the solenoid 18. It will be noted in FIG. 8 that shift pin 56 can only move back toward the neutral slot 46 when it is disposed in vertical slot 52 at which point pawl 118 and opening 120 are out of phase and the pawl cannot be engaged in aperture 120. At this time the shift pin is held between spin slot 48 and the neutral slot 46 by the upper surface of cam 112 but is positioned far enough down vertical slot 52 to engage shift bar 34 to displace it to the left thereby returning the transmission to a neutral position in which the pin can drop to the neutral slot. During this displacement of the shift bar pawl 118 moves relative to camming portion 112 so that when the shift bar has been returned to the neutral position the pawl is in registry with and falls into the opening 120. This positions the shift pin 56 within the neutral slot 46 and as the pin 56 moves toward the right the cam 112 is pivoted away from electrical contacts 94—98. When the agitate cycle is selected by the timer and the proper water level is indicated by closure of pressure switch contact 68, the solenoid 18 will not be energized until the circuit through coil 20 is completed by the shift pin moving toward the agitate slot 50 and the cam 112 moving toward the contacts 96—100 to close these contacts when the shift pin reaches the vertical slot 54. Completing the circuit through coil 20 will energize the solenoid and raise the shift pin 56 into the agitate slot 50. The shift pin now engages the shift bar 34 and displaces it to the left, shifting the transmission for the agitate cycle. The remainder of the agitator cycle and the shifting from agitate back to neutral is identical to that previously discussed with respect to the spin cycle and, therefore, will not be discussed here.

From the foregoing it should be apparent that no matter how fast the timer is advanced from agitate to spin, or vice versa, the sensing mechanism insures against holding the shift bar in the prior cycle—the sensing mechanism requires going back into neutral and re-sensing the proper moment to energize the coil. Furthermore, the shifting mechanism includes a desirable amount of lost motion subsequent to the end of one cycle and prior to shifting to another cycle to insure positive sequential operation. The lost motion results in a time delay which is in excess of the duration of the counter E.M.F. from the machine motor thereby eliminating that source of faulty operation in the form of gear clashing as explained above.

Although this invention has been discussed with regard to a particular preferred embodiment thereof, such discussion has been intended for illustrative purposes only and should not be taken by way of limitation. Accordingly, it is intended in the appended claims to cover all modifications and embodiments of this invention as fall within the true spirit and scope thereof.

What we claim is:

1. A shifting mechanism comprising, in combination, support means, an elongated shift bar slideably mounted on said support means and selectively movable between a neutral position and at least two operative positions, said shift bar including an elongated slot having a neutral portion corresponding to said neutral position and an operative portion corresponding to each of said operative positions, said neutral and operative portions being relatively spaced in a direction transversely of the longitudinal axis of said shift bar and the adjacent ends of said portions being connected by slots extending transversely of said longitudinal axis, a frame mounted on said support means for generally arcuate oscillatory motion relative thereto, a solenoid mounted on and oscillating with said frame, said solenoid including a plunger mounted for oscillation with said frame, said plunger including a driving portion disposed in said elongated slot and movable transversely of said longitudinal axis upon energization and de-energization of said solenoid, resilient means connected between said shift bar and said plunger for holding said plunger against rotation relative to said shift bar as said plunger moves longitudinally of said shift bar so that as said solenoid oscillates relative rotational movement occurs between said frame and said plunger, control means for pre-selecting one of said operating positions and being connected to and initiating the energization of said solenoid, a switch electrically connected to said control means and fixed to and oscillating with said frame, said switch including contacts corresponding to each of said operative positions and each operative to complete the energization of said solenoid, and a switch actuating cam including means for receiving a portion of said plunger when said solenoid is de-energized to establish a driving connection between said cam and said plunger and move said cam relative to said switch and for releasing said cam for oscillation with said frame and relative to said plunger when said solenoid is energized, said switch contacts and said cam so arranged that as said driving portion of said plunger is moved towards one of said operative portions said cam is moved toward engagement with a corresponding switch contact to energize said solenoid and move said driving portion into said one of said operative portions for displacement of said shift bar to a corresponding one of said operative positions, said plunger receiving means on said cam being so arranged relative to said plunger that after release of said cam upon energization of said solenoid said plunger receiving means will only be in registry with and re-engageable with said plunger after said shift bar has been displaced from said one operative position.

2. A shifting mechanism comprising, in combination, support means, a shift bar slideably mounted on said support means and selectively movable between a neutral position and at least two operative positions, a frame mounted on said support means for oscillatory movement relative to said support means and said shift bar, a solenoid mounted on and oscillating with said frame, said solenoid including a plunger connected for oscillation with said frame, said shift bar including plunger engaging means corresponding to each of said operative positions, said plunger engaging means positioned on said shift bar for engagement by said plunger upon energization of said solenoid for moving said shift bar to a respective one of said operative positions and for engagement by said plunger upon subsequent de-energization of said solenoid to return said shift bar to said neutral position, said plunger engaging means being so positioned relative to said plunger that when said shift bar is at rest in said neutral position and said operative positions said plunger is dis-engaged from and oscillates relative to said plunger engaging means, means for holding said plunger against rotation as its oscillates relative to said shift bar so that relative rotational movement occurs between said frame and said plunger, control means for pre-selecting one of said operating positions and being connected to and initiating the energization of said solenoid, sensing means fixed to and oscillating with said frame and including contacts corresponding to each of said operating positions for completing energization of said solenoid, means for actuating said sensing means to energize said solenoid, means for establishing a driving connection between said actuating means and said plunger when said solenoid is de-energized so that said actuating means is movable with said plunger relative to said sensing means and further for disengaging said plunger and actuating means when said solenoid is energized so that said plunger rotates relative to said actuating means, said contacts on said sensing means so arranged that as said plunger is moving toward one of said plunger engaging means said actuating means is moving toward engagement with a corresponding contact on said sensing means to energize said solenoid and move said plunger into engagement with said one plunger engaging means for displacement of said shift bar to said one operative position, said means for connecting said actuating means to said plunger further arranged relative to said plunger for establishing a driving connection between said actuating means and said plunger upon subsequent de-energization of said solenoid only after said shift bar has been moved out of said one operative position.

3. A shifting mechanism comprising, in combination, support means, a shift member mounted on said support means for movement between a plurality of positions relative to said support means, a solenoid mounted on said support means for movement into and out of engagement with said shift member to displace said shift member to selective ones of said positions, means for reciprocating said solenoid relative to said shift member, means interconnecting said solenoid and shift member for relative motion therebetween when said shift member is in one of said plurality of positions and for transmitting the reciprocating motion of said solenoid to said shift member when said solenoid is moved into engagement with said shift member, means for controlling the movement of said solenoid into and out of engagement with said shift member, said control means including means for initiating the energization of said solenoid and selecting one of said positions of said shift member and sensing means corresponding to each of the plurality of positions of said shift member for completing the actuation of said driving member, means connected to and movable with said solenoid for actuating said sensing means, said sensing means and said actuating means being so relatively positioned that as said solenoid is moving toward engagement with and displacement of said shift member to one of said positions said actuating member is moving toward engagement with a corresponding one of said sensing means to thereby complete the actuation of said solenoid for displacement of said driven member to said one position, and means for releaseably connecting said actuating means to said solenoid and arranged so that when said solenoid is engaged with said shift member said actuating means is disengaged from and moveable relative to said solenoid and so that said actuating means is re-engageable with said solenoid for movement therewith only after said shift member has been displaced from said one position.

4. A shifting mechanism comprising, in combination, support means, an elongated shift bar slideably mounted on said support means and selectively movable between a neutral position and at least two operative positions, said shift bar including an elongated slot having a neutral portion corresponding to said neutral position and operative portions corresponding to each of said operative positions, said operative portions being spaced from said neutral portions in a direction transversely of the longitudinal axis of said shift bar and the adjacent ends of said portions being connected by slots extending transversely of said longitudinal axis, a frame mounted on said support means for generally arcuate oscillatory motion relative thereto, a solenoid mounted on and oscillating with said frame, said solenoid including a plunger mounted for oscillation with said frame, said plunger including a driving portion disposed in said elongated slot and movable transversely of said longitudinal axis upon energization and de-energization of said solenoid, resilient means connected between said shift bar and said plunger for holding said plunger against rotation as said plunger oscillates longitudinally of said shift bar so that as said solenoid oscillates relative rotational movement occurs between said frame and said plunger, control means for selecting one of said operating positions and being connected to and initiating the energization of said solenoid, a switch connected to said control member and fixed to and oscillating with said frame, said switch including contacts corresponding to each of said operative positions and each operative to complete the energization of said solenoid, a switch actuating cam releasably connected to said plunger, said plunger when said solenoid is de-energized being fixed relative to said cam and being released from said cam when said solenoid is energized, said cam moving relative to said switch as said frame oscillates and said switch contacts so arranged that as said driving portion of said plunger is moved towards one of said operative portions said cam is moved into engagement with a corresponding switch contact to actuate said switch and energize said solenoid for movement of said driving portion to one of said operative portions for displacement of said shift bar to a corresponding one of said operative positions, said plunger releasing said cam on energization of said solenoid so that said cam remains in engagement with said switch and said driving portion remains in said one of said operative portions until said solenoid is de-energized by said control means.

5. A shifting mechanism comprising, in combination, support means, a shift bar slideably mounted on said support means and selectively movable between a neutral position and at least two operative positions, a frame mounted on said support means for oscillatory movement relative to said support means and said shift bar, a solenoid mounted on and oscillating with said frame, said solenoid including a plunger connected for oscillation with said frame, said shift bar including plunger engaging means corresponding to each of said operative positions, said plunger engaging means positioned on said shift bar for engagement by said plunger upon energization of said solenoid for moving said shift bar to a respective one of said operative positions and for engagement by said plunger upon subsequent de-energization of said solenoid to return said shift bar to said neutral position, said plunger engaging means being so positioned relative to said plunger that when said shift bar is at rest in said neutral position and said operative positions said plunger is disengaged from and oscillates relative to said plunger engaging means, means for holding said plunger against rotation as it oscillates relative to said shift bar so that relative rotational movement occurs between said frame and said plunger, control means for selecting one of said operative positions and being connected to and initiating the energization of said solenoid, sensing means fixed to and oscillating with said frame and including contacts corresponding to each of said operative positions for completing the energization of said solenoid, means releasably connected to said plunger for actuating said sensing means to energize said solenoid and so that said actuating means when said solenoid is de-energized is fixed relative to and movable with said plunger and upon energization of said solenoid is released from said plunger, said actuating means moving relative to said sensing means and said contacts on said sensing means so arranged relative to said actuating means that as said plunger is moving toward one of said plunger engaging means said actuating means is moving into engagement with a corresponding contact on said sensing means to energize said solenoid and move said plunger into engagement with said one plunger engaging means for displacement of said shift bar to said one operating position.

6. A shifting mechanism comprising, in combination, support means, a driven member mounted on said support means for movement into a plurality of positions relative to said support means, driving means mounted on said support means for movement into and out of engagement with said driven member to displace said driven member to selective ones of said positions, means interconnecting said driving and driven members for relative motion therebetween when said driven member is in one of said plurality of positions and for transmitting the motion of said driving member to said driven member when said driving member is moved into engagement with said driven member, means for controlling the movement of said driving means into and out of engagement with said driven member, said control means including sensing means corresponding to each of the plurality of positions of said driven member for actuation of said driving member for movement into engagement with said driven member and an actuating member connected to said driving member for movement therewith and relative to said sensing means, said sensing means so positioned relative to said actuating member that as said driving member is moving toward engagement with and displacement of said driven member to one of said positions said actuating member is moving toward engagement with a corresponding one of said sensing means for actuation of said driving member to displace said driven member to said one of said positions.

7. A shifting mechanism comprising, in combination, support means, a shift member slideably mounted on said support means for selective movement to one of a plurality of positions, a solenoid including a plunger movable relative to said shift member, upon energization and de-energization of said solenoid, means for reciprocating said solenoid relative to said shift member, at least a pair of plunger engaging means positioned at relatively spaced positions on said shift member to be engaged by said plunger upon energization and de-energization of said solenoid for selectively displacing said shift member to a respective one of its positions, and control means for selectively energizing and de-energizing said solenoid and including means for selecting one of said positions of said shift member and sensing means for coordinating the energization and de-energization of said solenoid in accordance with the position of said plunger relative to said shift member so that said solenoid will be energized only when said plunger is moving into engagement with one of said plunger engaging means corresponding to said selected position.

8. A shifting mechanism comprising, in combination, support means, a shift member slideably mounted on said support means for selective movement to one of a plurality of positions, shift means including a plunger movable into and out of driving engagement with said shift member, means for reciprocating said shift means relative to said shift member, at least a pair of plunger engaging means positioned at relatively spaced positions on said shift member to be engaged by said plunger for selectively displacing said shift member to a respective one of its positions, and control means for selectively moving said plunger into and out of engagement with said shift member and including means for selecting one of said positions of said shift member and sensing means for coordinating the movement of said plunger in accordance with the position of said plunger relative to said shift member so that said plunger is moved into driving engagement with said shift member only when said plunger is moving into engagement with one of said plunger engaging means corresponding to said selected position.

9. A shifting mechanism comprising, in combination, support means, a driven member mounted on said support means for movement relative thereto into a plurality of positions, a driving member movable into and out of driving engagement with said driven member, means for moving said driving member relative to said driven member, said driven member including means disposed at at least two relatively spaced positions on said driven member for engagement by said driving means to displace said driven member to respective ones of said operative positions, and control means for selectively moving said driving member into and out of engagement with said means on said driven member and including means for selecting one of said positions and sensing the relative position of said driving and driven members so that upon selection of one of said positions said driving member will only be moved into engagement with said driven member to displace said driven member to said one position.

10. A shifting mechanism comprising, in combination, support means, shift bar slideably mounted on said support means for selective movement between a neutral position and at least two operative positions, said shift bar including longitudinally extending slot having a mid portion corresponding to said neutral position and end portions corresponding to said operative positions, said end portions being spaced from said mid portion in the same direction transversely of the longtiudial axis of said shift bar, adjacent ends of said mid portion and each of said portions being joined by connecting slots extending transversely of said longitudinal axis, a solenoid including a plunger having a driving portion disposed in said elongated slot and movable upon energization and de-energization of said solenoid transversely of said longitudinal axis, means for oscillating said solenoid relative to said shift bar, and control means for selectively energizing and de-energizing said solenoid.

11. A shifting mechanism comprising, in combination, support means, shift bar slideably mounted on said support means for selective movement between a neutral position and at least two operative positions, said shift bar including longitudinally extending slot having a neutral portion corresponding to said neutral position and an operative portion corresponding to each of said operative positions, said operative portions being spaced from said neutral portion in a direction transversely of the longitudinal axis of said shift bar, adjacent ends of said neutral and operating portions being joined by connecting slots extending transversely of said longitudinal axis, a solenoid including a plunger having a driving portion disposed in said elongated slot and movable upon energization and de-energization of said solenoid transversely of said longitudinal axis, means for oscillating said solenoid and said plunger relative to said shift bar, and means for selectively energizing and de-energizing said solenoid to displace said driving portion toward a respective one of said operative portions for engagement with and displacement of said shift bar.

12. A shifting mechanism comprising, in combination, support means, a shift bar slideably mounted on said support means for selective movement between a neutral position and at least two operative positions, said shift bar including a longitudinally extending slot having a neutral portion corresponding to said neutral position and an operative portion corresponding to each of said operative positions, said operative portions being spaced from said neutral portion in a direction transversely of the longitudinal axis of said shift bar, adjacent ends of said neutral and said operating portions being joined by connecting slots extending transversely of said longitudinal axis, driving means disposed in said elongated slot, a solenoid connected to effect relative transverse movement between said driving means and said shift bar upon energization and de-energization of said solenoid, means for oscillating said driving means relative to said shift bar, and means for selectively energizing and de-energizing said solenoid to position said driving means in a respective one of said operative portions for engagement with and displacement of said shift bar.

13. A shifting mechanism comprising, in combination, support means, a shift bar slideably mounted on said support means for selective movement between a neutral position and at least two operative positions, said shift bar including a longitudinally extending slot having a neutral portion corresponding to said neutral position and an operative portion corresponding to each of said operative positions, said operative portions being spaced from said neutral portion in a direction transversely of the longitudinal axis of said shift bar, adjacent ends of said neutral and operating portions being joined by connecting slots extending transversely of said longitudinal axis, driving means disposed in said elongated slot, shift means connected to effect relative transverse movement between said driving means and said shift bar, means for oscillating said driving means relative to said shift bar, and means for selectively moving said shift means to position said driving means in a respective one of said operative portions for engagement with and displacement of said shift bar.

14. A shifting mechanism comprising, in combination, support means, a shift member slideably mounted on said support means for selective movement to one of a plurality of positions, a solenoid including a plunger movable relative to said shift member upon energization and de-energization of said solenoid, means for reciprocating said solenoid relative to said shift member, at least a pair of plunger engaging means positioned at positions spaced on said shift member a distance substantially equal to the distance the solenoid is reciprocated and to be engaged by said plunger upon energization and de-energization of said solenoid for selectively displacing said shift member to a respective one of its positions, and control means for selectively energizing and de-energizing said solenoid.

15. A shifting mechanism comprising, in combination, support means, a driven member mounted on said support means for movement into a plurality of positions relative thereto, a driving member movable into and out of driving engagement with said driven member, means for moving said driving member relative to said driven member, said driven member including means disposed at at least two relatively spaced positions separated on said driven member a distance substantially equal to the distance the driving member moves relative to the driven member for engagement by said driving member to displace said driven member to respective ones of said positions, and control means for selectively moving said driving member into and out of engagement with said means on said driven member.

16. A shifting mechanism comprising, in combination, support means, a driven member mounted on said support means for movement relative thereto into a plurality of positions, a driving member movable into and out of driving engagement with said driven member, means for moving said driving member relative to said driven member, said driven member including means disposed at at least two positions on said driven member and spaced relative to each other in a direction parallel to the direction of movement of said driven member to said plurality of positions for engagement by said driving means to displace said driven member to respective ones of said positions, the spacing of the last named means being substantially equal to the movement of the driving member relative to the driven member, and control means for selectively moving said driving member into and out of engagement with said means on said driven member.

17. A shifting mechanism comprising, in combination, a shift bar having three positions, drive means engageable with said shift bar for moving said shift bar to selective ones of said positions, said drive means including a solenoid having two operative positions and in one of said positions arranged to engage said shift bar for displacement of said shift bar to either one of two of its three positions, and means for selectively controlling movement of said solenoid to its operative positions.

18. A shifting mechanism comprising, in combination, a shift member having three positions, drive means engageable with said shift member for moving said shift bar to selective ones of said positions, a solenoid having two operative positions and in one of said positions being operative to effect engagement of said drive means and said shift member for displacement of said shift member to either one of two of its three positions, and means for selectively controlling movement of said solenoid to its operative positions.

19. A shifting mechanism comprising, in combination, a shift bar having three positions, drive means engageable with said shift bar for moving said shift bar to selective ones of said positions, said drive means including a shift means having two operative positions and in one of said positions arranged to engage said shift bar for displacement of said shift bar to either one of two of its three positions, and means for selectively controlling movement of said shift means to its operative positions.

20. In a shifting mechanism the combination of shift member, a driving member, a frame, means for oscillating said frame in a generally arcuate path relative to said shift member, means connecting said driving member to said frame for oscillation therewith and rotation relative thereto, and resilient means for connecting said driving member to said shift member and for holding said driving member against rotation relative to said shift member so that as said frame oscillates with respect to said shift member said driving member moves longitudinally and generally transversely of said shift member and said driving member rotates relative to said frame.

21. In a shifting mechanism the combination of a shift member, a driving member, a frame, means for oscillating said frame in a direction extending generally longitudinally of said shift member, means connecting said driving member to said frame for oscillation therewith and rotation relative thereto, and means for holding said driving member against rotation relative to said shift member so that as said frame oscillates with respect to said shift member said driving member moves relative to said frame.

22. A selective switching mechanism comprising, in combination, a control mechanism for selecting one of a plurality of operative positions and initiating actuation of said switching mechanism into said one of said operative positions, a driving member, a movable frame member, said driving member connected to said frame member for movement with and movement relative to said frame, a switch member rigid with and movable with said frame, said switch member connected to said control mechanism and including contacts corresponding to each of said operative positions for completing the actuation of said switching mechanism to said one of said operative positions, and an actuator disposed on said frame and releasably connected to said driving member for movement therewith, said actuator moving relative to said switch member and said contacts being so positioned relative to said actuator that as said driving member is moving toward one of said operative positions said actuator is moving toward a corresponding one of said contacts.

23. A selective switching mechanism comprising, in combination, a control mechanism for selecting one of a plurality of operative positions and initiating actuation of said switching mechanism into said one of said operative positions, a sensing mechanism including means corresponding to each of said operative positions for completing actuation of said switching mechanism, a first movable member, a second movable member, and means interconnecting said first and second movable members for joint movement and further for limited relative movement, said sensing switch being connected to and movable with said first movable member, said second movable member being movable toward said operative positions and disposed to engage said sensing switch, said contacts on said sensing switch so arranged that as said second movable member is moving toward one of said operative positions said second movable member is also moving toward a corresponding one of said means on said sensing switch for actuation thereof.

References Cited in the file of this patent
UNITED STATES PATENTS
2,610,498   Geldhof et al. __________ Sept. 16, 1952